United States Patent

Brolin et al.

[11] Patent Number: 4,687,892
[45] Date of Patent: Aug. 18, 1987

[54] INERT ATMOSPHERE CONTROL FOR INDUCTION HEATED PRESSURE WELDING SYSTEM

[75] Inventors: Charles A. Brolin; Dennis A. Jennerjohn; Richard E. Moeller, all of Cedar Rapids, Iowa

[73] Assignee: FMC Corporation, Chicago, Ill.

[21] Appl. No.: 895,085

[22] Filed: Aug. 11, 1986

[51] Int. Cl.⁴ .......................................... B23K 13/00
[52] U.S. Cl. ...................................... 219/8.5; 228/219
[58] Field of Search .................... 219/9.5, 8.5, 61.2, 219/74, 59.1; 228/219, 220, 42

[56] References Cited

U.S. PATENT DOCUMENTS

| | | | |
|---|---|---|---|
| 2,542,393 | 2/1951 | Chapman | 219/6 |
| 2,805,316 | 9/1957 | Chapman | 219/72 |
| 2,819,517 | 1/1958 | Pursell | 228/219 |
| 2,892,914 | 6/1959 | Rudd | 219/9.5 |
| 2,919,335 | 12/1959 | Shaughnessy | 219/9.5 |

OTHER PUBLICATIONS

An article entitled: Pressure Butt Welding of Steel Pipe Using Induction Heating by S. G. Harris in Welding Research Supplement dated Feb. 86 (8 pages).

*Primary Examiner*—Nicholas P. Godici
*Assistant Examiner*—Karen Skillman
*Attorney, Agent, or Firm*—Ronald C. Kamp; Richard B. Megley; Alan J. Moore

[57] ABSTRACT

A method and apparatus is disclosed for purging air from multiple surfaces of members to be welded together. The apparatus includes a hood with the inert gas entering the hood at about 150 cubic feet per minute at between 2-5 pounds per square inch gauge when handling approximately 2½ inch diameter tubes. The gas is first evenly spread in the hood to fill the entire cross sectional area thereof and is then moved through a straightening section to provide laminar flow of the gas across the multiple surfaces. An induction coil is moved between hood closure means into the hood to heat the weldable surfaces to a bonding temperature and after the coils have been removed from the hood, the members are urged together to upset the heated surfaces to weld the two members together.

24 Claims, 4 Drawing Figures

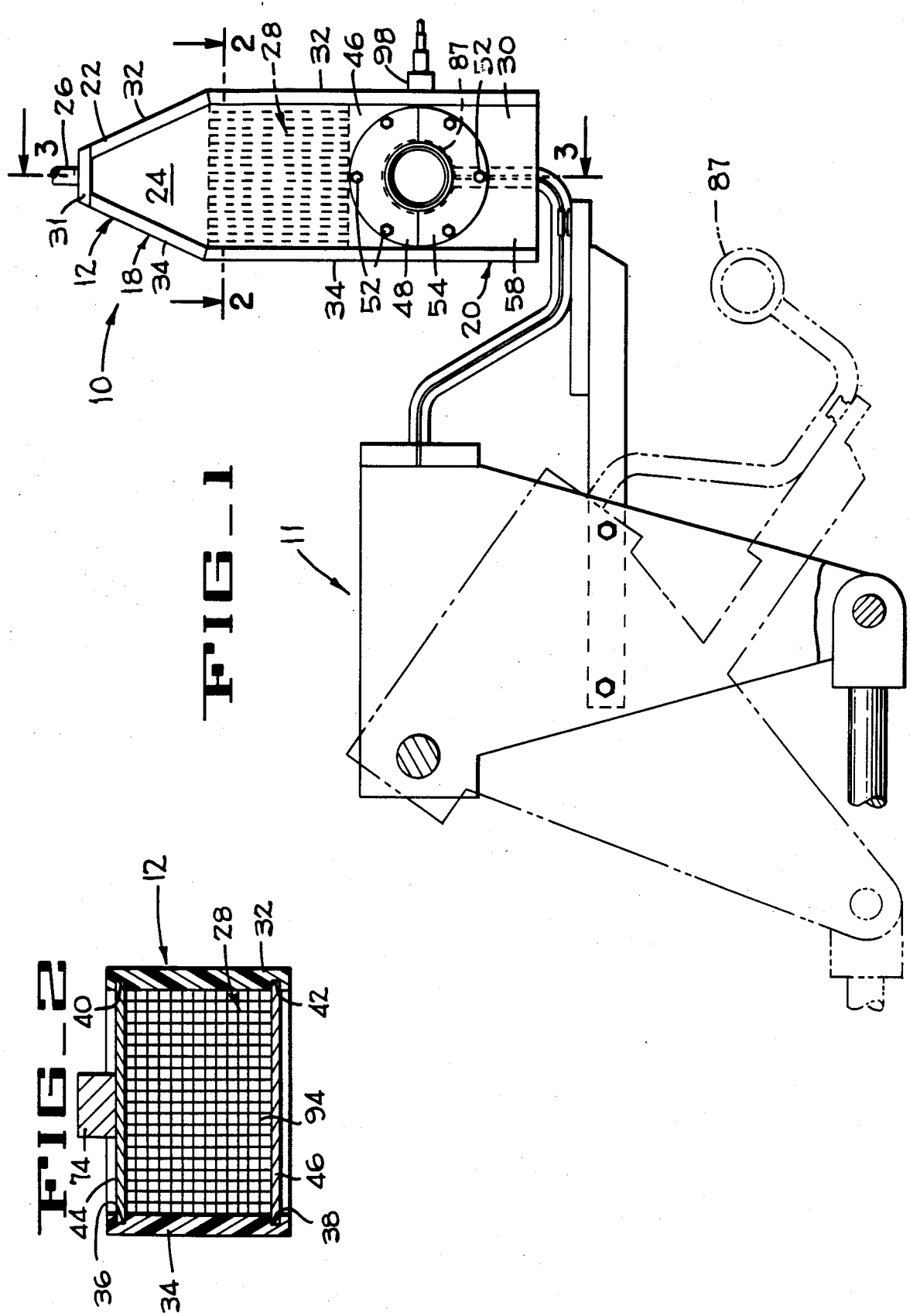

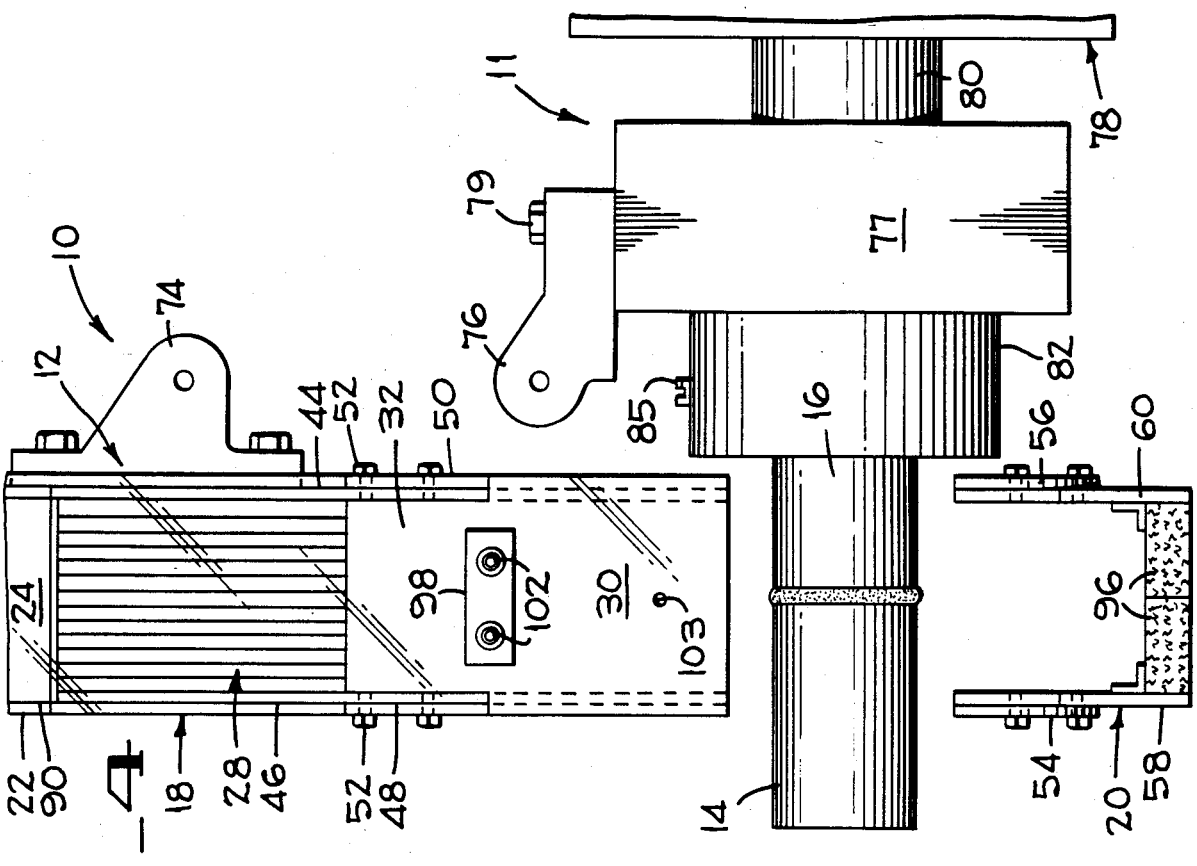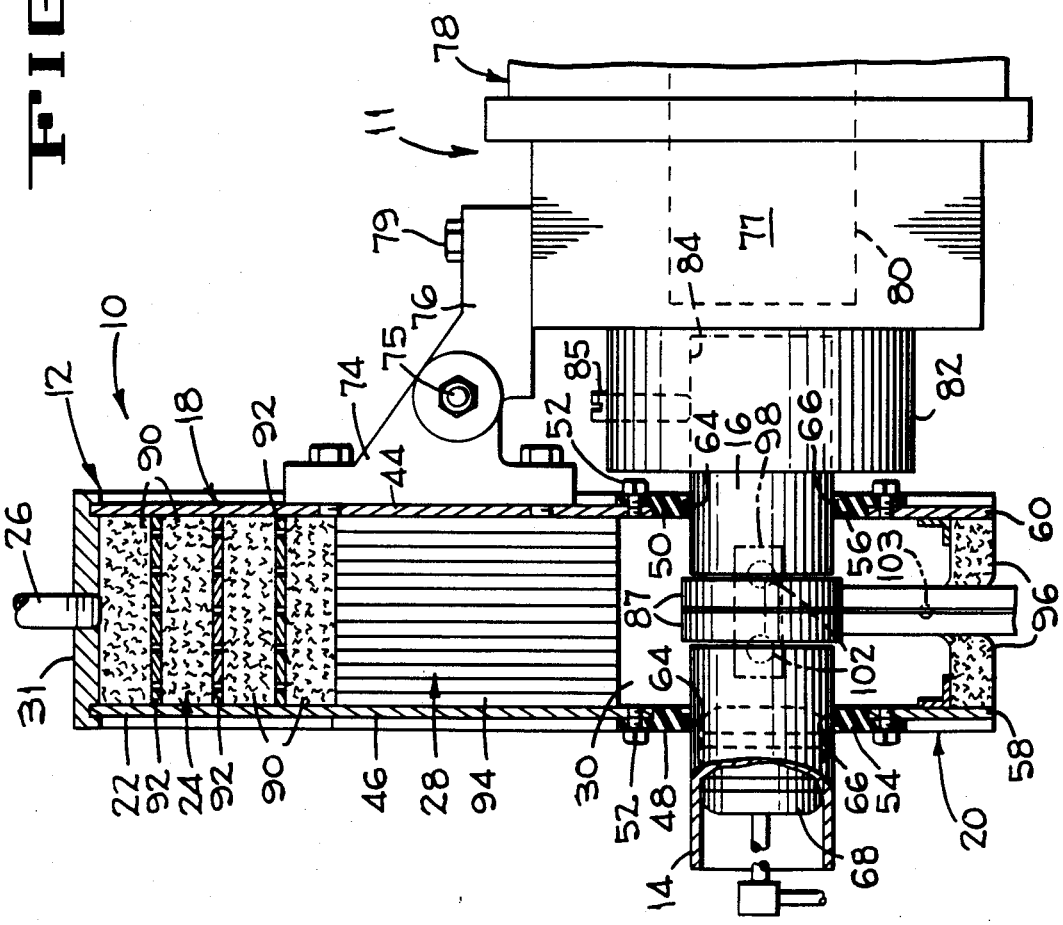

4,687,892

INERT ATMOSPHERE CONTROL FOR INDUCTION HEATED PRESSURE WELDING SYSTEM

CROSS REFERENCE TO RELATED APPLICATIONS

The present invention relates to the inventions described in the following applications, all of which are assigned to the assignee of the present invention, are filed on even date herewith and are incorporated by reference herein.

Brolin application Ser. No. 844,656 filed Mar. 27, 1986 entitled Induction Heating Pressure Welding.

Brolin et al application Ser. No. 895,399 filed Aug. 11, 1986 entitled Induction Heating Pressure Welding With Rotary Bus Bar Joint.

Brolin application Ser. No. 902,858 filed Sept. 2, 1986 entitled Induction Heating Pressure Welding With Linear Bus Bar Joint.

Brolin et al application Ser. No. 896,904 filed Aug. 11, 1986 entitled Dual Induction Heat Pressure Welding Control Circuit.

BACKGROUND OF THE INVENTION

Field of the Invention

The present invention pertains to a method and apparatus for maintaining the atmosphere around articles substantially inert, and more particularly relates to a method and apparatus for maintaining two surfaces to be induction heated and pressure welded together in a substantially inert atmosphere.

SUMMARY OF THE INVENTION

The present invention includes a two-piece hood which encompasses the weldable surfaces of two members to be welded together in a substantially oxygen free environment. An inert gas at high volume and relatively low pressure is directed into the upstream portion of the hood and first flows through a series of perforated plates separated by foam rubber pads before entering a second chamber having a honeycomb therein for establishing a laminar flow of the inert gas which assures that all air upstream of the honeycomb is forced therethrough. The laminar flow of the inert gas then enters a workpiece receiving chamber and quickly removes air from around the weldable surfaces and discharges the air and inert gas through centrally split foam rubber pads or the like which permit an induction heating coil to be inserted into, and be removed from, the workpiece chamber. The inert gas enters one end of the hood at a volume of about 150 cubic feet per minute at a gauge pressure of about two to five pounds per square inch for providing a positive pressure for driving air out the other end of the hood.

BRIEF DESCRIPTION OF THE DRAWINGS

FIG. 1 is a side elevation of the apparatus of the present invention which diagrammatically illustrates an induction coil in position to heat the surfaces being welded in full lines, and illustrating the coil in its inactive position withdrawn from the hood in phantom lines.

FIG. 2 is a section taken along lines 2—2 of FIG. 1.
FIG. 3 is a section taken along lines 3—3 of FIG. 1.
FIG. 4 is a front elevation showing the three part hood with the lower part removed from the upper part and from the members after the members have been welded together.

DESCRIPTION OF THE PREFERRED EMBODIMENT

The inert atmosphere contol mechanism 10 (FIGS. 1-4) of the present invention is associated with an induction heating pressure welding system 11 (only a portion being diagrammatically shown) as disclosed in Brolin et al application Ser. No. 895,399 filed Aug. 11, 1986.

The control mechanism 10 comprises a three piece hood 12 which encompasses the adjacent end portions of the two members 14,16 (FIGS. 3 and 4) to be welded together by induction heating and pressure welding. The hood includes an upstream or upper portion 18 and a lower portion 20, which lower portion is formed from two L-shaped halves. The lower portion 20 is connected to the upper portion by frictional engagement and the two halves are held in substantially air tight engagement with the two members 14,16 to be heated and then pressure welded together.

The upper portion 18 includes a tapered inlet housing 22 that defines a gas inlet chamber 24 which receives the inert gas from a conduit 26 and directs the gas into a flow straightening chamber 28 and thereafter into a processing or welding chamber 30 which is partially formed by the lower portion 20. The hood 12 has a top wall 31 with grooves therein and opposed front and rear walls 32,34 formed of transparent material such as plexiglass with grooves 36,38,40 and 42 (FIG. 2) therein which mate with the grooves in the top wall 31. The grooves in the transparent material and top wall receive edge portions of side walls 44,46 of aluminum or the like which edge portions are connected together in air tight engagement as by adhesive bonding.

Although the transparent front and rear walls 32,34 project downwardly to the bottom of the hood 12 as best shown in FIGS. 1 and 4, it will be noted that the side walls 44,46 of the upper portion 18 of the hood terminate at the horizontal centerline of the members 14,16 to be welded together. A pair of non-metallic arcuate adapters 48,50 engage the weldable members 14,16 and are connected to the side walls 44,46 by cap screws 52.

Similar adapters 54,56 are secured to side walls 58,60 of the two piece lower portion 20 of the hood. The side walls are held in the lower portions of the grooves 36,38,40 and 42 by frictional force when in operative position as shown in FIGS. 1 and 3. When in operative position, an opening is formed in the adapters which closely conform to outside dimensions of the members 14 and 16 to be welded together, which members are illustrated as tubular members although it will be understood that the adapters may be of other sizes and shapes to accommodate members to be welded together of different sizes and shapes. The workpiece engaging surfaces of the adapters are slotted to receive resilient non-metallic air tight seals 64,66 (FIG. 3) of polytetrafluroethylene or the like. If the workpieces to be welded together are large tubular members open to air, a pneumatic inflatable plug 68 (FIG. 3) or the like may be inserted in each member to prevent air from flowing into the hood through the workpiece 14,16.

The upper portion 18 (FIGS. 3 and 4) of the hood 12 is bolted to a bracket 74 which is pivotally connected by a bolt 75 to a bracket 76 that is connected by a cap screw 79 to a reciprocable spacer 77 of the welding system 11 which is movable between the FIG. 3 heating position and the FIG. 4 welded position. When the upper portion 18 is separated from the lower portion 20, the bolt 75 may be removed as illustrated in FIG. 4, or alternatively, the bolt 75 may remain in place and the bracket 76 may be unbolted from the spacer 77 by removing cap screw 79.

The welding system also includes a hydraulic ram 78 (only a fragment being shown in FIGS. 3 and 4) having a piston rod 80 upon which the spacer 77 and a collar 82 are removably mounted. The collar 82 is provided with a cavity 84 (FIG. 3) which controllably receives one end of the element 16 that is locked in place by set screw 85. The welding system 11 also includes an induction coil or coils 87 that are mounted for movement between the weldable end portions of the elements 14,16 to be welded together as illustrated in FIGS. 1 and 3, and an inactive position externally of the hood 12 as shown in phantom lines in FIG. 1. After the induction coil or coils 87 raise the end surfaces of the members 14,16 to a welding temperature, the coils 87 are rapidly moved out of the hood 12 to the phantom line position illustrated in FIG. 1. Immediately thereafter, the piston rod of the ram and the member 16 is moved to the left (FIG. 3) with sufficient force to upset and weld the heated weldable surfaces of the elements 14,16 together. Thereafter the lower portion 20 of the hood 12 is removed from the upper portion 18, and the upper portion 18 is lifted upwardly to its element discharging or inactive position illustrated in FIG. 4 after first removing the bolt 75. The induction heating and pressure welding operation requires about 5 to 7 seconds.

If oxygen is present around and between the heated surfaces to be welded together, it is known that scaling of the metal will occur thus greatly weakening the weld or preventing the surfaces from being welded together. Accordingly, an inert gas such as argon, helium or nitrogen, or a mixture of about 95% argon and 5% hydrogen, is directed into the hood to purge air from the weldable surfaces of the members 14,16 while being heated and upset.

The inert gas from the conduit 26 enters the inlet housing 22 and passes through a series of foam rubber (or the like) pads 90 separated by plates 92 having a plurality of approximately 0.09 inch diameter holes therein. The pads are preferably fiberglass or open cell foam pads of vinyl or urethane foams. The plates are spaced about 1 inch apart. The foam pads and spacers 92 assures that the inert gas entering the chamber 24 at about 150 cubic feet per minute at a pressure of about 2-5 pounds per square inch gauge when welding about 2½ inch diameter tubes together. The gas progressively decreases in pressure and spreads evenly to fill the whole cross sectional area of the hood as it progressively moves downwardly through the foam pads 90 and plates 92 thus purging any air therein downwardly. The gas then moves downwardly into the laminar flow chamber 28 and flows through a cardboard honeycomb 94 having a plurality of about 3/16th inch diameter vertical passages therein which discharge a laminar flow of inert gas downwardly into the welding chamber 30 and past the surfaces to be welded thus forcing any air present around the surfaces to be welded away from the surfaces and out of the welding chamber 30 through two lower foam pads 96 which are secured to the side walls 58,60 of the two L-shaped halves which make up the lower portion 20 of the hood 12. The lower pads 96 will open intermediate their ends to permit the coil 87 to enter and be withdrawn from the hood. A pad 98 is secured to the front transparent wall 32 to provide a pair of ports 102 to which fiber-optic sensors (not shown) are connected to and send temperature signals to optical pyrometers (not shown) for sensing the temperatures of the two surfaces to be welded together. An oxygen analyzer (not shown) is connected to a port 103 for determining when the atmosphere in the welding chamber has discharged substantially all oxygen therefrom.

It will be understood that the weldable surfaces of the members 14 and 16 that are to be induction welded together may both be ferric metals, one may be a ferric metal and the other may be a non-ferric metal, or both may be non-ferric metals.

As used herein and in the claims, the term inert gas need not be 100% inert but may include other types of gases which aid the welding process. Inert gases such as argon, helium and nitrogen may be used and successful test welds have been made with a 95% argon and 5% hydrogen atmosphere.

From the foregoing description it is apparent that a method and apparatus has been disclosed which directs a high volume of inert gas at a low pressure through pressure gradients which first spread the gas throughout the entire cross sectional area of the hood and then forces the gas through a honeycomb which provides a high volume laminar flow of gas into a welding chamber which quickly purges air away from the weldable surfaces of the members to be welded and out of the hood through the foam rubber pads.

Although the best mode contemplated for carrying out the present invention has been herein shown and described, it will be apparent that modification and variation may be made without departing from what is regarded to be the subject matter of the invention.

What is claimed is:

1. An apparatus for purging air from surfaces of members to be induction heated, comprising:
   means defining a hood having an inlet chamber, a flow straightening chamber, and a processing chamber therein;
   means for directing an inert gas into said inlet chamber of said hood at a high volume and low pressure;
   means for restricting the flow of inert gas through the inlet chamber for causing the gas to decrease in velocity and evenly fill the whole transverse cross section of said inlet chamber while providing a gradually reducing pressure gradient in the hood;
   means in said flow straightening chamber for receiving the gas from said inlet chamber and for straightening the flow of gas passing therethrough for providing a laminar flow of inert gas which is directed past said weldable surfaces for quickly purging air from said surfaces; and
   closure means for permitting the inert gas and air trained therein from discharging out of said hood while maintaining a higher gas pressure within said hood than the air pressure externally of the hood.

2. An apparatus according to claim 1 wherein the surfaces of the members are to be welded together and wherein said processing chamber is a welding chamber.

3. An apparatus according to claim 2 and additionally comprising an induction heating coil, means for moving said induction coil through said closure means into said welding chamber to heat said weldable surfaces to a bonding temperature, and to thereafter retract said coil from said hood through said closure means, and means for forcing said heated surfaces together to upset said surfaces thereby welding the two members together.

4. An apparatus according to claim 2 wherein said restricting means comprises a series of diffusers, and a series of deflectors separating said diffusers.

5. An apparatus according to claim 4 wherein said closure means comprises a pair of contacting flexible pads.

6. An apparatus according to claim 3 wherein said closure means comprises a pair of contacting foam pads which permit movement of said induction coil through said closure means while maintaining said higher gas pressure within said hood than the air pressure externally of the hood.

7. An apparatus according to claim 1 wherein said inert gas is argon.

8. An apparatus according to claim 6 wherein said inert gas is 95% argon and 5% hydrogen.

9. An apparatus according to claim 6 wherein said gas is helium.

10. An apparatus for purging air from an induction heating pressure welding chamber having two members with weldable surfaces positioned therein, comprising:
    means defining a hood having an inlet portion and an outlet portion removably connected to each other and disposed in sealed engagement with each other and with said two members to be welded together;
    means for directing an inert gas into said inlet portion of said hood;
    means defining a gas diffusing inlet chamber in said hood for diffusing said inert gas for filling the whole cross sectional area of said gas diffusing chamber and to create a plurality of gradually decreasing pressure zones in said inlet chamber as the gas flows therethrough;
    means defining a flow straightening chamber for receiving the gas from said gas diffusing chamber for assuring that the gas flows in a laminar path through said straightening chamber and provides a laminar flow of inert gas through said welding chamber and past the weldable surfaces of said members to quickly entrain air therein, and
    porous gas closure means for discharging the inert gas and entrained air from said hood while retaining a pressure in said welding chamber higher than the ambient pressure surrounding said hood.

11. An apparatus according to claim 10 wherein said hood includes an upper portion and a lower portion which are maintained together in gas sealing engagement with each other and with the two members to be welded together when in operative welding positions, and which may be removed from each other and from said two members when in an inoperative position permitting easy removal and replacement of the members in the hood after the welding operation has been completed.

12. An apparatus according to claim 10 wherein said gas diffusing chamber means comprises a plurality of foam pads, and a plurality of perforated plates for separating said pads from each other.

13. An apparatus according to claim 10 wherein said flow straightening chamber means includes a honeycomb for straightening the flow of gas passing therethrough for providing a laminar flow past the surfaces to be welded together.

14. An apparatus according to claim 12 wherein said flow straightening chamber means includes a honeycomb for straightening the flow of gas passing therethrough for providing a laminar flow past the surfaces to be welded together.

15. A method of purging air from weldable surfaces of members to be welded together while within a hood having an inlet chamber comprising the steps of:
    encompassing the weldable surfaces within the hood;
    directing an inert gas into the hood at high volume and relatively low pressure;
    restricting the flow of inert gas in the inlet chamber of the hood for causing the gas to decrease in velocity for filling the entire transverse cross-sectional area of the inlet chamber of said hood while providing a gradually reduced pressure gradient in said hood;
    passing the inert gas with any entrained air therein through a flow straightening chamber for directing a laminar flow past the weldable surfaces for quickly purging air from said surfaces; and
    forcing the inert gas with air entrained therein out of the hood while maintaining a higher gas pressure within said hood than the air pressure externally of the hood.

16. A method according to claim 15 wherein said inert gas enters the hood at a pressure between about 2-5 psi gauge and at a volume of about 150 cubic feet per minute when the members are tubes having an outside diameter of about $2\frac{1}{2}$ inches.

17. A method according to claim 15 and additionally comprising the steps of induction heating the weldable surfaces to a welding temperature and pressure upsetting said heated weldable surfaces to weld said members together while in the inert atmosphere within said hood.

18. A method according to claim 15 wherein said inert gas is argon.

19. A method according to claim 15 wherein said inert gas is a mixture of about 95% argon and 5% hydrogen.

20. A method according to claim 15 wherein said inert gas is helium.

21. A method according to claim 15 wherein sai inert gas is nitrogen.

22. A method according to claim 15 wherein the hood includes a series of pads spaced between a series of plates for restricting the high volume flow of inert gas within the inlet chamber while filling the whole transverse cross sectional area with said inert gas.

23. A method according to claim 22 wherein the hood includes an outlet end having a pair of urethane, vinyl or rubber foam outlet pads releasably closing said outlet end to provide a higher gas pressure within the hood than the atmosphere externally of the hood.

24. A method according to claim 23 wherein an induction coil for heating the weldable surfaces is provided, and including the steps of passing the coil between said outlet pads and between said weldable surfaces for heating the surfaces to a bonding temperature and for thereafter withdrawing the coil from between said surfaces and out of said hood, and forcing said heated weldable surfaces together with sufficient force to upset said heated surfaces and weld said two members together.

* * * * *